United States Patent [19]

Stetson et al.

[11] Patent Number: 4,692,339

[45] Date of Patent: Sep. 8, 1987

[54] PROCESS FOR ADDITION AND STABILIZATION OF VITAMIN C IN A HARD CANDY-LIKE COMESTIBLE

[76] Inventors: Charles G. Stetson, P.O. Box 76, Yankton, S. Dak. 57078; Catherine C. Stetson, 2794 E. 8th, #202, Sioux Falls, S. Dak. 57103

[21] Appl. No.: 670,006

[22] Filed: Nov. 8, 1984

Related U.S. Application Data

[63] Continuation-in-part of Ser. No. 430,598, Sep. 30, 1982, abandoned.

[51] Int. Cl.[4] .................. A23L 1/302; A23G 3/00
[52] U.S. Cl. .................. 426/72; 426/660; 426/512; 514/474
[58] Field of Search ............ 426/660, 72, 249; 424/280; 426/512

[56] References Cited

U.S. PATENT DOCUMENTS

| | | | |
|---|---|---|---|
| 2,676,136 | 4/1954 | Myhre | 424/280 |
| 2,721,161 | 10/1955 | Maiese | 424/280 |
| 3,525,791 | 8/1970 | Ahrens | 424/280 |
| 4,153,732 | 5/1979 | Muhler | 426/660 |
| 4,311,722 | 1/1982 | Vink | 426/660 |
| 4,517,205 | 5/1985 | Aldrich | 426/66 |

OTHER PUBLICATIONS

Bush, Skuse's Complete Confectioner, Bush & Co. Ltd., London, England, 1957, pp. 41-43.
Roth, Old Fashioned Candymaking, Henry Regnery Co., Chicago, Ill., 1974, pp. 87-88.

*Primary Examiner*—Jeanette Hunter
*Attorney, Agent, or Firm*—Roland H. Shubert

[57] ABSTRACT

Vitamin C is added to candy-like comestibles requiring high cooking temperatures in the form of powdered ascorbic acid and/or sodium ascorbate at a precise time in the cooking cycle. The Vitamin C is rapidly dispersed in the hot fluid candy and the admixture is cast into molds and rapidly cooled thereby stabilizing ascorbic acid within the crystalline lattice of the candy and avoiding any significant Vitamin C loss through oxidation or decomposition.

13 Claims, 2 Drawing Figures

PROCESS FOR ADDITION AND STABILIZATION OF VITAMIN C IN A HARD CANDY-LIKE COMESTIBLE

REFERENCE TO RELATED APPLICATIONS

This is a continuation-in-part of U.S. patent application Ser. No. 430,598 filed Sept. 30, 1982 now abandoned.

BACKGROUND OF THE INVENTION

This invention relates generally to a process for the incorporation of Vitamin C into a cooked, candy-like comestible without significant loss of the vitamin and to vitamin-containing comestibles produced by the inventive process.

There have been developed and marketed a number of candy-like vitamin containing formulations primarily directed toward children who resist taking vitamin pills or who have difficulty in swallowing pills. Those formulations containing Vitamin C are typically of a gritty consistency and are formed by tabletting a dry mix of sugars, vitamins and binder.

A manufacturing approach commonly used in the prior art is to tumble the dry mixture with additions of small amounts of water to form granules. The granules are then compression molded, typically in a tabletting press, to form the chewable vitamin pills so prevalent on the market today. Tablets are formed using the same process but they are coated to facilitate easy swallowing. Both the tumbling and compression molding steps are carried out without auxiliary heating because of the instability of many of the vitamins to heat. In fact, it is commonly accepted in the industry that heat processing methods must be totally avoided in the manufacture of vitamin C-containing formulations.

The advantages of a hard candy-like, Vitamin C-containing formulation which is suckable and attractive in flavor and color have long been recognized in the industry. Such a formulation provides for a natural time release of the Vitamin C allowing for maximum absorption as well as maximizing the antimicrobial effect of the vitamin on teeth and gums. There is less likelihood of stomach upset with slow ingestion. Possibilities of choking, as with tablets, is greatly reduced especially among small children and the elderly. In addition, formulations of this type have a high degree of appeal for most consumers.

In spite of the apparent and recognized advantages of hard candy-like, Vitamin C formulations, the industry has not yet been able to successfully produce them. A major reason for this failure is the delicate and unstable nature of the Vitamin C molecule (ascorbic acid) and of its commonly used salts. It is so chemically fragile that exposure to air or heat for even modest periods of time results in substantial vitamin loss. For example, Department of Agriculture data shows that simple cooking procedures often cause a fifty percent or more loss of Vitamin C. When baked-in-the-skin potatoes sit on a steam table for thirty minutes, there is a 34% Vitamin C loss with the loss rising to 59% over the next fifteen minutes. Peeled and cut potatoes experience about 39% loss in Vitamin C during cooking with that loss rising to about 95% during the first hour on a steam table. A Vitamin C containing throat lozenge, currently being marketed, is reputed to lose one-third to one-half of the original Vitamin C content during formulation.

Muhler et al in U.S. Pat. No. 4,153,732 describes various anticariogenic candies containing a combination of a soluble aluminum salt and either adipic acid or ascorbic acid as the cariostatic additive. Examples shown in the patent utilize adipic acid in both tabletted and cooked candy with ascorbic acid use limited to tabletted candy only. While patentees do not comment on the reasons for this selection, it is well known that adipic acid is far more chemically stable than is ascorbic acid.

The impracticality of compounding ascorbic acid or any of its commonly employed salts to form a comestible requiring high temperature processing was long ago recognized by Ahrens in U.S. Pat. No. 3,525,791. Ahrens found that only one salt of ascorbic acid, namely calcium ascorbate dihydrate, had sufficient heat stability to withstand processing without significant decomposition at those temperatures commonly employed in candy making, i.e., 250° F. and greater. Unfortunately, the use of that salt, calcium ascorbate dihydrate, is not practical to consider for food use. In a proposed rule published Jan. 14, 1983, the Food and Drug Administration concluded that calcium ascorbate should be removed from the GRAS (generally recognized as safe) list as a direct human food ingredient.

SUMMARY OF THE INVENTION

Hard, cooked, candy-like comestibles containing nutritionally useful amounts of Vitamin C are prepared without significant loss of the vitamin during processing. A candy forming compound is dissolved in water and is cooked until a temperature, typically about 300° F., is reached whereat a hard candy will be formed upon cooling. Vitamin C in the form of powdered ascorbic acid and/or sodium ascorbate is then added to the hot, fluid candy syrup, is rapidly dissolved therein to form a uniform admixture, is immediately thereafter cast into molds and is rapidly cooled. The comestible may be formed as a traditional lollipop and, in one embodiment, may comprise a candy-like shell surrounding an inner core containing vitamins, minerals and nutritional supplements.

Accordingly, it is an object of this invention to provide a method for the preparation of hard, cooked, candy-like comestibles and the incorporation of Vitamin C therein without significant loss of the vitamin during processing.

It is another object of this invention to provide suckable, Vitamin C-containing comestibles which allow for timed release of the vitamin and anticariogenic effects during consumption.

Yet another object of this invention is to provide a composite vitamin-containing comestible having an inner core incorporating vitamins, minerals and nutritional supplements surrounded by a hard, candy-like shell containing vitamin C and to a method for the preparation of the composite comestible.

It is another object of this invention to stabilize ascorbic acid by incorporating it in the crystalline lattice of a hard, cooked, candy-like comestible so as to assure long shelf life.

BRIEF DESCRIPTION OF THE DRAWING

Specific embodiments of the invention are illustrated in the drawing in which.

DISCUSSION OF THE INVENTION

Figure 1:
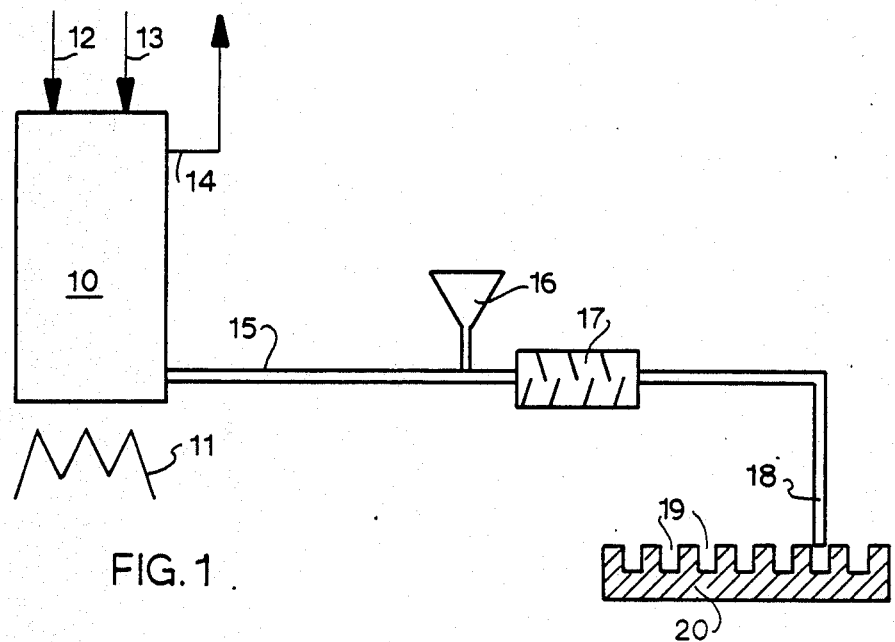
FIG. 1 is a generalized flow sheet showing a preferred method for preparation of the comestibles of this invention.

Hard candies have long been made by boiling a sugar solution to evaporate most of the water and reach what is called the "hard crack" stage; i.e., that temperature at which a sample dropped into cold water hardens into a crystalline mass. The "hard crack" stage is reached at approximately 305° F. when using sucrose as the sugar. It is conventional to add a wide variety of coloring and flavoring agents to such candies including, for example, citric acid, tartaric acid, various essential oils and food dyes of various sorts as colorings. These coloring and flavoring agents typically are added either to the sugar solution before cooking or are worked into the candy while in a hot plastic state by extended kneading.

Attempts to incorporate Vitamin C, either as ascorbic acid or as one of its salts, into such hard candies by those traditional techniques produced totally unsatisfactory results. There was found to be an unacceptably high loss of Vitamin C, ranging as high as 30% to 50% or more of the vitamin added. In addition, the appearance and texture of many samples were unsatisfactory, being cloudy rather than clear and having a gritty feel to the tongue.

It has been found that Vitamin C may successfully be incorporated into hard candies without significant loss of the vitamin provided that certain critical processing parameters are observed. First, it is critical that the Vitamin C compound be added as a solid powder, not as a solution, after cooking is complete but while the hot candy is still in a very fluid stage. If flavorings and colorings are added at the end of the cooking cycle, they must be incorporated into the mixture after the Vitamin C addition. Otherwise, the candy product will be cloudy and gritty as the Vitamin C will not properly disperse and dissolve. The Vitamin C compound must be rapidly dispersed throughout the hot fluid and as quickly thereafter as possible the fluid candy must be cast and rapidly cooled to a crystalline state. As soon as the candy cools to a temperature where it is a crystalline solid, the Vitamin C is stabilized and no further loss occurs.

Adding the Vitamin C compound as a solid powder reduces to a minimum the extremely rapid oxidation of the ascorbate anion which occurs at even moderately elevated temperatures. Addition of the Vitamin C to the molten solution while it is extremely fluid and before it has cooled to a plastic state allows a very rapid dispersion of the vitamin powder to form a homogeneous admixture. Immediate pouring of the admixture into molds with rapid cooling then stabilizes the Vitamin C and prevents decomposition.

The stabilization of the Vitamin C is believed to occur by incorporation of the vitamin compound in the crystalline lattice formed by the candy-like comestible. The art has recognized that there are at least two intrinsic contributions to the instability of the Vitamin C molecule. One is stereochemical strain owing to polar repulsive forces. The other is the activity due to the double bonds of the molecule which is conducive to autoelimination and/or water attachment to the double bond. Auto destructive forces are enhanced by the presence of multivalent cations and by exposure to light and oxygen. With the Vitamin C stabilized within the crystal structure of the hard candy it is virtually impossible for oxygen or water vapor to contact the vitamin. Consequently, autoelimination of a double bond of the ascorbate anion is virtually impossible. Also, it is believed that incorporation of the Vitamin C within the hard candy crystalline lattice decreases the stereochemical strain of the molecule. For the above reasons, a long shelf life is expected.

A Vitamin C-containing comestible formulated as a suckable hard candy provides advantages not obtainable with liquid, pill or chewable vitamin compositions. Vitamin C, when released in mouth fluids as by sucking, has known local antimicrobial effects withou attacking the tooth enamel. Particularly when formulated without sugar, which is one preferred embodiment of this invention, there is provided a non-cariesforming vehicle for the administration of Vitamin C.

In a preferred structural embodiment, the hard candy comestible of this invention is formed as a lollipop with a handle. This embodiment has special advantages with some consumer groups, particularly children and all others who have difficulty in swallowing a pill or are sensitive to stomach upset. It is often quite difficult to administer pills to children, especially young children, while sucking on a lollipop is pleasurable and reduces the possibilities of choking as well. By this method of administration, there is obtained a natural, slow, time release of the vitamin allowing for maximum absorption. Because the vitamin is introduced slowly, the possibility of digestive upset is minimized.

Broadly speaking, the comestible of this invention may be formulated using any candy-forming compound as a base material. For the purposes of this disclosure, candy-forming compounds are defined as including those sugars, polyhydric alcohols and similar compounds which form a hard, crystalline candy upon cooking an aqueous solution of the compound to candy forming temperature, casting the cooked solution, and cooling. While sucrose is most commonly used in making hard candies of this sort, it is the least preferable as the base material for the Vitamin C formulations of this invention. Fructose is a preferred sugar because of its metabolic characteristics allowing it to be digested without the need for insulin. The most preferred candy-forming compounds are the polyhydric alcohols, particularly sorbitol, xylitol, mannitol and mixtures thereof.

A wide range of appeal-enhancing flavoring, coloring and auxiliary, non-sugar, sweetening agents may also be incorporated into the formulations as with traditional hard candy products. Examples of appeal-enhancing additives include essential oils such as oil of lemon, citric acid, tartaric acid, food coloring agents and synthetic sweeteners.

All formulations made in accordance with this invention must contain nutritionally significant quantities of Vitamin C. For the purposes of this disclosure, a nutritionally significant quantity is defined as containing within a single dosage unit, a single lollipop for example, at least about 10% of the recommended daily allowance (RDA) of Vitamin C. In most instances, it is not desirable to exceed 100% of the RDA per single dosage unit. However, in experimental formulations, up to 10 times the RDA of Vitamin C as ascorbic acid or sodium ascorbate was successfully added to the matrix without undesirable taste or texture changes. It is conceivable that even larger amounts of ascorbic acid could be added.

EXEMPLARY EMBODIMENTS OF THE INVENTION

Sepcific embodiments of this invention illustrating the novel features and improved results obtained will be first described by reference to the drawing. Referring now to FIG. 1, there is shown a generalized flow sheet particularly adapted for the manufacture of comestibles having a polyhydric alcohol base such as sorbitol. This same technique may be used with minor modifications for the production of sugar based comestibles as well.

There is provided a closed retort or chamber 10 which is equipped with heating means 11. A water solution of sorbitol 12, which is commercially available at 70% concentration is added to retort 10 along with an additional quantity of sorbitol powder 13. The powder dissolves in the solution with heating and it is preferable that the solution within retort 10 be mixed, either intermittently or continuously, during heating and dissolving. Alternatively, water may be introduced at 12 with all of the sorbitol (or sugar) added as a solid. It is preferred that a vacuum 14 be drawn on the retort 10 during the latter stages of the cooking procedure as this speeds the cooking process, aids in removal of evaporated water vapor and lowers somewhat the temperatures required to obtain a candy-forming composition.

At the conclusion of the cooking cycle, which may be determined by monitoring the temperature of the material within the retort, the highly fluid candy-forming composition is discharged through line 15. A finely powdered Vitamin C compound; ascorbic acid, sodium ascorbate, or mixtures thereof, is introduced at a metered rate into line 15 by means of solids feeder 16. Feeder 16 is placed just upstream of mixing means 17. Mixing means 17 is characterized as having a low detention time must be capable of rapidly and uniformly dispersing a powdered solid within a liquid. It preferably is an in-line continuous mixer either of the active type, i.e., having agitating means, or the passive type; i.e., an in-line motionless mixer.

A blended admixture of Vitamin C compound in the fluid candy base is transferred from the mixer outlet through delivery line 18 to cavities 19 of mold 20. Mold 20 is constructed so as to rapidly chill the hot candy admixture to a temperature whereat it hardens and becomes crystalline. Rapid cooling of the fluid mixture within the mold cavity until it becomes solid and crystalline is mandatory in order to hold Vitamin C loss to a minimum. Such rapid cooling may be achieved by ensuring that mold 20 has a high heat capacity, thus providing a large heat sink relative to the volume of the mold cavities, or by providing cooling means to remove heat from the mold. It is generally undesirable to allow more than about one minute exposure of the Vitamin C compound to the hot candy base at hard crack temperatures; from the time the Vitamin C compound is added to the hot candy base until the time that it is cast into molds and solidified to a crystalline state.

In a preferred embodiment, the cavities 19 of mold 20 are configured to form spherical, oval, or disc-like shapes typical of conventional lollipops. A handle may be inserted into the candy base within the mold before it hardens.

Figure 2:
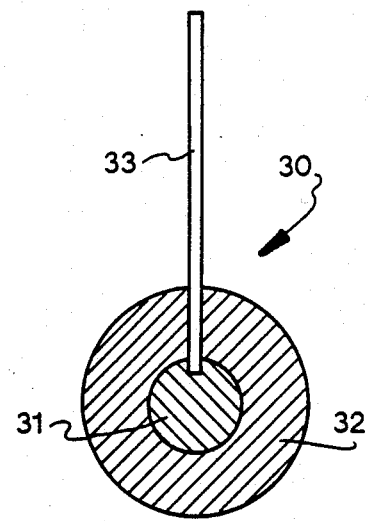
FIG. 2 is a sectional view of a composite comestible in accordance with the invention.

FIG. 2 illustrates another embodiment of this invention in which there is provided a composite lollipop-like comestible 30 having an inner core 31 and an outer shell 32. The inner core 31 may comprise vitamins, minerals and nutritional supplements including for example Vitamins A, B1, B2, B6, B12, D, E and K, trace metals such as zinc, pantothenic acid, niacinamide and the like formulated in a base material of binding and stabilizing agents and shaped into a sphere or disc by pressing or similar techniques as is known in the art and described earlier in this disclosure. Shell 32 comprises the Vitamin C-containing hard candy previously described. A handle or stick 33 is inserted into the body of the composite as is shown.

The lollipop-like comestible 30 may be formed using the process described in relation to FIG. 1. In this embodiment, the inner core 31 is formed as previously described preferably with stick 33 inserted or attached to the core. Cores are then centered within cavities 19 of mold 20 and conveniently may be held in that position by means of stick 33. Fluid Vitamin C-containing candy base is then poured into each mold cavity as previously described to form a hard, suckable shell around each core. Not only does the outer shell enhance taste appeal, it protects the ingredients in the core from light radiation, gases, and other environmental contaminants which might affect their stability.

Novel features and improved results obtained by practice of this invention are illustrated by the following examples.

EXAMPLE 1

A sugar-water solution was prepared by dissolving sugar in water at room temperature. A quantity of Vitamin C in the form of ascorbic acid was then dissolved in the sugar solution. The sugar-water-Vitamin C solution was then rapidly heated, over a 20 minute period, to the hard crack stage or about 150° C. A sample was removed from the batch at the twentieth minute as soon as the hard crack stage was reached, rapidly cooled, and held for analysis. The remainder of the batch was maintained at constant temperature of 150° C. and additional samples were taken periodically, rapidly cooled, and held for analysis. The sample taken was cloudy and had a gritty texture.

Each of the samples was then analyzed for Vitamin C content using standard polarographic techniques and standard iodiometric titration with the following results.

TABLE

| Time after Commencement of Heating (minutes) | Vitamin C Retained (% of original concentration) |
|---|---|
| 20 | 80 |
| 23 | 55 |
| 28 | 38 |
| 33 | 32 |

A similar sugar-water solution was then prepared and heated to the hard crack state. Immediately thereafter Vitamin C in the form of ascorbic acid was added to the solution, rapidly stirred to disperse the Vitamin C, and the batch was immediately poured into molds and rapidly cooled. The candy was analyzed for Vitamin C, again by standard polarographic techniques and iodiometric titration, and it was found that essentially 100% of the original Vitamin C content was retained in the candy.

As may be appreciated from the data, it is critical to this invention that exposure of the candy base to high temperatures after Vitamin C has been added must be held to as short a time span as possible. One fifth of the Vitamin C was lost merely in bringing the solution to candy-making temperature. Nearly one half of the Vitamin C was destroyed after holding the candy base at candy-making temperature for a mere three additional minutes. Note that it is common practice in the candy industry to add all of the ingredients and additives to the sugar solution at the beginning of the process.

EXAMPLE 2

A liquid solution of sorbitol of 70% concentration was placed into a closed vessel along with an additional quantity of dry, powdered sorbitol. There was also added to the solution flavoring and coloring agents and sodium ascorbate. The vessel was sealed and was rapidly heated with agitation while a vacuum was drawn on the interior of the vessel. The mixture was heated to 300° F. (149° C.) and the liquid mixture was then immediately shot through a delivery tube into the cavities of a mold wherein it was cooled and further dried under vacuum.

The mold cavities were of a disc shaped to form a lollipop-like product. The resulting sorbitol candy shapes were evaluated for appearance and taste. The product was cloudy in appearance and had a gritty texture but it was considered to have good flavor and taste. Sodium ascorbate losses of a magnitude comparable to those reported in the table of Example 1 were observed.

EXAMPLE 3

The experiment of example 2 was repeated except that sodium ascorbate was added not to the solution before cooking but to the hot (300° F.), cooked mixture. Immediately after mixing in the sodium ascorbate, the liquid was cast into molds as before and rapidly cooled. The resulting products were glassy and semi-transparent in appearance, were smooth in texture and, upon analysis it was found that eassentially all of the added sodium ascorbate was retained in the product.

EXAMPLE 4

Fructose-base lollipops were made by the following procedure. Four ounces of water was heated to boiling and one cup of fructose was added. The resulting solution was thereafter heated rapidly to the soft crack stage and then more slowly heated to the hard crack stage. Seven thousand five hundred milligrams of sodium ascorbate along with one and one half teaspoons of a coloring agent and one teaspoon of a flavoring agent were added to the candy base. The mixture was then poured into twenty-one sucker molds.

Of the eight suckers submitted for testing, four were analyzed for Vitamin C by the University of South Dakota by a polarographic technique using a glassy carbon electrode and standard iodiometric titration. Vitamin C content of the suckers, which varied somewhat in weight, ranged from 244 to 352 milligrams per sucker with the average being 305 milligrams.

As can be seen from the presented examples, the process of this invention can employ a variety of candy forming compounds. Special advantages are obtained through use of this invention when polyhydric alcohols such as sorbitol are employed as the candy forming compound. In such cases, practice of this invention not only results in an essentially complete retention of the Vitamin C but significantly improves the appearance and texture of the product as well.

It is to be understood that the preceding description and examples illustrate preferred embodiments of the invention and that certain variants thereof apparent to those skilled in the art will be within the spirit and scope of the invention.

We claim:

1. A method for making a cooked, hard Vitamin C-containing comestible comprising:
   dissolving a candy-forming compound, selected from the group consisting of sugars, polyhydric alcohols and mixtures thereof, in water;
   heating the resulting solution to a temperature whereat a hard candy will be formed upon cooling to thereby form a molten candy;
   removing the molten candy from the heat source and, while said candy is hot and fluid, dispersing within the molten candy solid Vitamin C-containing compound selected from the group consisting of ascorbic acid, sodium ascorbate and mixture thereof to form a uniform admixture thereof;
   immediately thereafter casting said admixture into molds, and
   rapidly cooling the cast admixture within the molds to a solid, crystalline state wherein the elasped time between introduction of the Vitamin C-containing compound into the molten candy and its cooling to a solid crystalline state in molds is less than one minute.

2. The method of claim 1 wherein said nutritionally significant amount of Vitamin C-containing compound ranges from about 10% to about 100% of the recommended daily allowance per molded candy piece.

3. The method of claim 1 wherein said candy-forming compound is fructose.

4. The method of claim 1 wherein sid candy-forming compound is a polyhydric alcohol.

5. The method of claim 4 wherein said polyhydric alcohol is selected from the group consisting of sorbitol, xylitol and mixtures thereof.

6. The method of claim 5 wherein a vacuum is drawn on said solution while it is heated.

7. The method of claim 1 wherein a powdered Vitamin C-containing compound is introduced at a metered rate into a flowing stream of molten candy and is thereafter passed directly through an in-line continuous mixer.

8. The method of claim 7 wherein said mixer is a motionless mixer.

9. The method of claim 1 wherein the cavities in said molds are of lollipop shape.

10. The method of claim 1 wherein a solid core comprising vitamins and minerals is centered in the cavities of said molds and said molten Vitamin C-containing candy admixture is cast around said core.

11. A hard, cooked, Vitamin C-containing comestible produced by the process of claim 1.

12. A method for preventing the loss of Vitamin C in the manufacture of hard, cooked comestibles comprising:
   preparing a solution of a candy-forming compound, selected from the group consisting of sugars, polyhydric alcohols and mixtures thereof, in water;
   heating said solution to a temperature whereat a hard candy will be formed upon cooling to thereby form a molten candy;
   passing a stream of said molten candy, without further heating, through a continuous, solid-liquid mixing means;
   introducing a metered stream of a solid, powdered, Vitamin C-containing compound selected from the group consisting of ascorbic acid, sodium ascorbate and mixtures thereof into said stream of molten candy just prior to its entry into said mixing means;

passing the resulting admixture directly to the cavities of a mold, and cooling the contents of each mold cavity at a rate whereby said contents become solid and crystalline in less than one minute from the time said Vitamin C-containing compound was introduced into said molten candy.

13. The method of claim 12 wherein said candy-forming compound is a polyhydric alcohol selected from the group consisting of sorbitol, xylitol and mixtures thereof.

* * * * *